US 6,655,594 B2

(12) United States Patent
Barmettler et al.

(10) Patent No.: US 6,655,594 B2
(45) Date of Patent: Dec. 2, 2003

(54) DOCUMENT, SYSTEM, AND METHOD FOR DATA STORAGE AND ACQUISITION

(75) Inventors: James W. Barmettler, Corvallis, OR (US); Kevin G. Currans, Philomath, OR (US)

(73) Assignee: Hewlett-Packard Development, L.P., Houston, TX (US)

( * ) Notice: Subject to any disclaimer, the term of this patent is extended or adjusted under 35 U.S.C. 154(b) by 98 days.

(21) Appl. No.: 10/042,969

(22) Filed: Jan. 8, 2002

(65) Prior Publication Data

US 2003/0127507 A1 Jul. 10, 2003

(51) Int. Cl.⁷ ................................................ G06K 7/10
(52) U.S. Cl. .............................. 235/462.07; 235/462.45
(58) Field of Search ........................ 235/462.45, 462.07

(56) References Cited

U.S. PATENT DOCUMENTS 6,036,094 A * 3/2000 Goldman et al. ...... 235/462.45

OTHER PUBLICATIONS

Spencer,Harry, "Standard to Encode Data on Forms" Published on the Internet at http://www.hsassaocs.com/prelim_encode_std.pdr at lest as early as Nov. 26, 2001, (exact date of publication unknown) 9 pages.

Author Unknonwn, "Introduction to 2D Barcodes" Published on the INternet at http://www.visionshape.com at least as early as Apr. 1, 2001, (exact date of publication not known) 5 pages.

Author unknown, "Introduction to Barcodes" Published on the Internet at http://www.visionshape.com/introbar.html at least as early as Nov. 26, 2001, (exact date of publication unknown) 7 pages.

Author unknown, "PDF417:New2–D (two Dimensional) Barcode Recognition" Published on the Internet at http://www.visionshape.com/2Dbarcode.html at least as early as Nov. 26, 2001, (exact date of publication unknown). 5 pages.

* cited by examiner

Primary Examiner—Harold I. Pitts (57) ABSTRACT

A document, system, and method are provided for data storage and acquisition. In one embodiment, the document comprises an amount of data embodied in a bar code located on the document, where a number of data files are included in the data. Also, a selector is located on the document, the selector being positioned relative to a predefined point on the document. A selector specification is included in the data, the selector specification referencing the position of the selector relative to the predefined point on the document. An association in the data drawn between the selector specification and at least one of the data files.

31 Claims, 6 Drawing Sheets

FORM

January Monthly Statement

| Date | Withdrawal | Deposit | Balance |
|------|------------|---------|---------|
| 1/1/00 | | 1300.00 | 3600.00 |
| 1/2/00 | | 200.00 | 3800.00 |
| 1/7/00 | 1500.00 | | 5300.00 |
| 1/20/00 | | 200.00 | 5500.00 |
| 1/28/00 | | 300.00 | 5800.00 |
| 1/30/00 | | 50.00 | 5850.00 |

☐ Microsoft Excel
☐ Quicken
☐ Lotus                ☐ Option A

```
<Data>
    <File Name="BadNews.wav"/>
    <CheckBox Name="MS Money Box" DX="-400" DY="-20" BoxWidth="10" BoxHeight="10" command="total">
        <OS Name="MAC">
            <File Name="AccountInfo.mmf" ContentType="application/vnd.excel">
                ...file contents here...
            </File>
        </OS>
        <OS Name="Windows">
            <File Name="AccountInfo.mmf" ContentType="application/vnd.excel">
                ...file contents here...
            </File>
            <File Name="AccountInfo2.mmf" ContentType="application/vnd.excel">
                ...file contents here...
            </File>
        </OS>
    </CheckBox>
    <CheckBox Name="Quicken Box" DX="100" DY="0" BoxWidth="10" BoxHeight="10" command="total">
        <OS Name="MAC">
            <File Name="AccountInfo.qif" ContentType="application/vnd.quicken">
                ...file contents here...
            </File>
        </OS>
        <OS Name="Windows">
            <File Name="AccountInfo.qif" ContentType="application/vnd.quicken">
                ...file contents here...
            </File>
        </OS>
    </CheckBox>
    <CheckBox Name="Tax Information" DX="-400" DY="170" BoxWidth="10" BoxHeight="10" >
        <File Name="TaxInfo.qif" ContentType="application/vnd.quicken">
            ...file contents here...
        </File>
    </CheckBox>
</Data>
```

DOCUMENT, SYSTEM, AND METHOD FOR DATA STORAGE AND ACQUISITION

TECHNICAL FIELD

The present invention is generally related to the field of data handling and, more particularly, is related to a document, system, and method for data storage and acquisition.

BACKGROUND

In many different circumstances, data is periodically transported in small amounts in the form of paper documents. Such is the case, for example, with monthly billing or reporting statements such as electricity bills, telephone bills, or bank statements to name a few. As the use of personal computers in the home becomes more prevalent in society, many individuals keep track of their finances on a computer using, for example, a spreadsheet or other similar program. For some individuals, the monthly billing or reporting statement might be obtained online through the World Wide Web or other network.

However, there can often be problems with obtaining such information online. In particular, the data may not always be available such as, for example, when the data provider experiences trouble with their server or if the network is otherwise unavailable due to various problems, etc. Also, many individuals are concerned about privacy and security problems that may arise transmitting their private financial information online. Still others prefer a paper copy of their billing statements as a permanent record of their transactions.

Consequently, individuals who do not want their personal information provided over a network for the above reasons are forced to enter such information provided on monthly statements into their computer system using an appropriate application.

SUMMARY

In light of the forgoing, the present invention provides for a document, system, and method for data storage and acquisition. In one embodiment, a document is provided that comprises an amount of data embodied in a bar code located on the document, where a number of data files are included in the data. Also, a selector is located on the document, the selector being positioned relative to a predefined point on the document. A selector specification is included in the data, the selector specification referencing the position of the selector relative to the predefined point on the document. An association in the data drawn between the selector specification and at least one of the data files.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIG. 3 is a drawing of a second embodiment of the data embodied in the two dimensional bar code on the document of FIG. 1;

DETAILED DESCRIPTION

The present invention provides for a document, system, and method for data storage and acquisition in the form of a bar code. Specifically, the information may be embodied in data files that are included in data embodied in a two dimensional bar code. A number of selectors such as check boxes are included on the document that are associated to respective ones of the data files in the two dimensional bar code. According to an aspect of the present invention, a user may mark one or more of the check boxes, thereby indicating a preference that certain ones of the data files be accessed by an appropriate application. The present invention further provides for an automated analysis of scanned bar codes and the associated check boxes to determine a user's wishes as to which of the data files is to be accessed by what applications.

Figure 1:
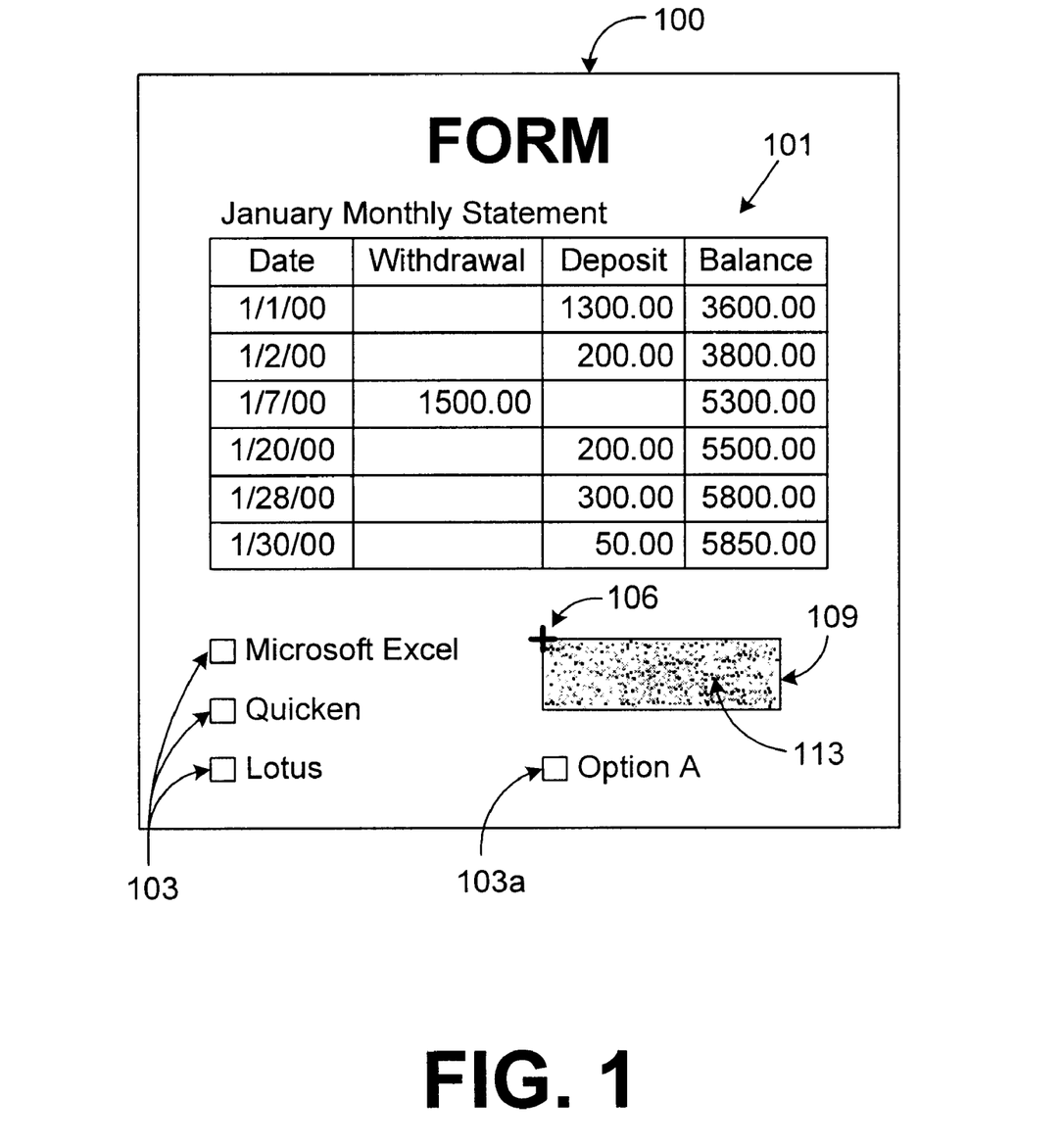
FIG. 1 is drawing of a document that includes a two dimensional bar code that includes an amount of data and a number of selectors associated with the data according to an embodiment the present invention.

With reference to FIG. 1, shown is a document 100 according to an embodiment of the present invention. The document 100 may be, for example, a monthly statement or form that provides periodic information such as, for example, a telephone bill, power bill, or a monthly banking statement. In this respect, the document 100 includes an amount of transactional data 101 or other information relative to the subject matter with which it relays. For example, if the document 100 were a bank statement, then the transactional data 101 may relay monetary transactions as is customary with such instruments.

The document 100 includes a number of selectors 103 that are located on the document 100 in a predefined position relative to a predetermined point 106 on the document 100 as will be discussed. The document 100 also includes a bar code 109. The bar code 109 may be, for example, a two-dimensional bar code that provides for the storage of a significant amount of data. In this respect, the bar code 109 may contain, for example, data files that contain the data relayed by the document 100 such as the transactional data 101 as depicted in FIG. 1. The document 100 also includes one or more subordinate selectors 103a that may or may not relate to one or more of the selectors 103 as will be discussed.

Embodied in the bar code 109 is an amount of data 113 that may comprise, for example, a number of data files that depict various information such as, for example, the transactional data 101 relayed on the document 100.

The document 100 provides for a convenient storage and data acquisition device to access the information depicted thereon using an appropriate application in a computer system. Specifically, a user may put a check, an "X", or other mark in one or more of the respective selectors 103 or subordinate selector 103a that may provide an indication of a particular action or application that is to be employed in accessing the data embodied within the data files in the bar code 109. For example, assume that the data files embodied in the data 113 provide different versions of the same financial data for different applications such as, for example, Microsoft Excel, Quicken, or Lotus. Also assume that the user may wish to keep their financial records up to date with the statement. To do so, the information displayed on the document 100 need be entered into their computer system.

To provide for a convenient approach in entering such information, the information may be embodied in one or more of the data files in the data 113 embodied in the bar code 109. The user may place a checkmark, "X", or other marking in the respective selector 103 that corresponds to the application is to be run on their computer system to access the data in the respective data files.

The document 100 may then be scanned by a scanner, thereby generating a digital document that is a digital representation of the document 100 stored in the computer system. The computer system is programmed to analyze the bar code 109 that appears in the digital document. Information contained in data 113 allows the computer system to identify the respective selector 103 that has been marked by the user. The computer system is programmed to access one or more of the data files embodied in the data 113 in the bar code 109 and to launch the respective application associated with the respective selectors 103. Thus, when the selector 103 labeled "Microsoft Excel" has been marked, the computer system may automatically runs Microsoft Excel and accesses data files within the data 113 that can be displayed by Microsoft Excel and so on. Thus, by including the data files into the data 113 embodied in the bar code 109, the data is automatically accessible by an application, thereby eliminating the tedious process of entering such information into a computer system manually.

Figure 2:
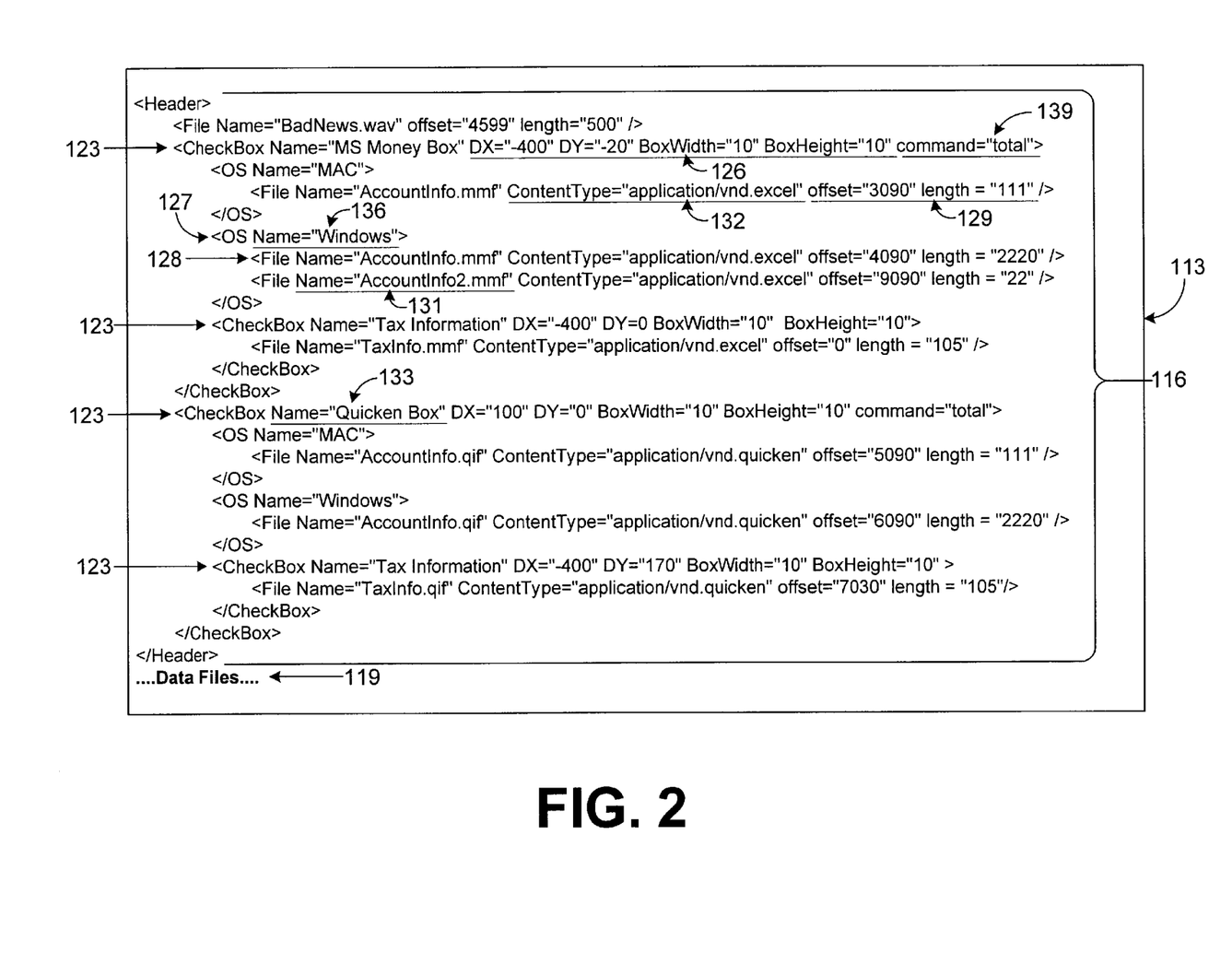
FIG. 2 is a drawing of the data header embodied in the data embodied in the two dimensional bar code on the document of FIG. 1, the data having a header.

With reference to FIG. 2, shown is the data 113 that is embodied in the bar code 109 (FIG. 1) according to an aspect of the present invention. The data 113 includes a header 116 that contains information relative to a number of data files 119 that are included in the data 113. The header 116 includes, for example, a number of selector specifications 123 according to an aspect of the present invention. Each of the selector specifications 123 includes a selector reference 126 that references the position of a relative selector 103 (FIG. 1) on the document 100 (FIG. 1) relative to the fixed point 106 (FIG. 1). In this respect, the selector reference 123 includes rectangular coordinates (X, Y) that delineate the relative position of the selector 103 to the fixed point 106, as well as dimensional information about the selector 103 itself. While rectangular coordinates are shown, one with ordinary skill in the art can appreciate that the relative position of the selector 103 to the fixed point 106 may be expressed in polar coordinates or some other coordinate system. In particular, the coordinate system that can express the coordinates needed using a minimal amount of data to save on space in the two dimensional bar code 109 (FIG. 1) is desirable. Also, while the fixed point 106 is depicted at a corner of the bar code 109, it is understood that the fixed point 106 may be positioned anywhere on the document 100 (FIG. 1).

The header 116 is embodied in the form of an associative data structure such as, for example, an extensible mark up file (XML), a tree structure, or other associative structure. In this respect, associations are drawn between the various elements by virtue of encapsulation and/or primary and subordinate indentations or other indication of relationship. Each of the elements within the associative data structure may be viewed as a "node" and each subordinate element thereto is referred to as the children of the identified node.

The children of the selector specifications 123 can include operating system tags 127 and file specifications 128. In some cases, the file specifications 128 are children of the operating system tags 127. Each of the file specifications 123 includes a data file pointer 129. Each data file pointer 129 provides a specific location of an associated data file 119 in the bar code 109 (FIG. 1). In this respect, the data file pointer 129 is indicated with an offset and a length value. The offset indicates a starting position of a respective data file 119 in the bar code 109. The length value indicates the length of the data file 119 in the bar code 109. Each of the file specifications 128 also includes a filename 131 of the associated data file 119. The file specifications 128 may also include a mime type 132 that indicates an application that is to be employed to access the data file 119. By virtue of the fact that a particular file specification 128 is subordinate to or is a child of the selector specification 123 (or is a child of a child of the selector specification 123, etc.), the file specification 128 is associated with the selector specification 123. Consequently, the selectors 103 (FIG. 1) are associated with the data files 119, respectively.

Each of the selector specifications 123 may also include an application identifier 133 that is associated with at least one of the data files 119. The application identifier 123 generally identifies an application that is to be executed to access the respective data files 119 associated with the selector specification 123. Alternatively, the mime type 132 that is associated with each respective data file 119 may be employed by appropriate operating systems such as UNIX or other operating systems to determine the application that is to be executed to access the respective data files 119.

In the case that the children of the selector specification 123 are operating system tags 127, the children of the operating system tags 127 may include one or more file specifications 128 for files that are compatible with the respective operating system 136 indicated as an attribute in the operating system tags 127.

Also, the selector specification 123 may include a command line parameter 139 that indicates a command that is to be applied to the application identified in the application identifier 133 when accessing one of the data files 119 referenced in the selector specification 123. In this respect, the command line parameter 139 provides an ability to automatically implement a specific function of the application in accessing one or more of the data files 119 as will be discussed.

With respect to FIG. 3, shown is an alternate version of the data 113a according to another aspect of the present invention. In the data 113a, there is no header 116 (FIG. 2) as was the case with the data 113 (FIG. 2). Also, the file specifications 128 do not include the data file pointers 129 (FIG. 2). Instead, the data file 119 that is associated with a respective file specification 128 is included between the respective tags of the file specification 128. Thus, a data file 119 is associated with a respective selector specification 123 by virtue of its location relative to the respective selector specification 123 in the data 113a. Specifically, the data file 119 is associated with a respective selector specification 123 by the fact that it is a child or is otherwise subordinate to the selector specification 123. Other aspects of the data 113a are similar to the data 113 as was previously described and, consequently, are not discussed in detail herein.

Figure 4:
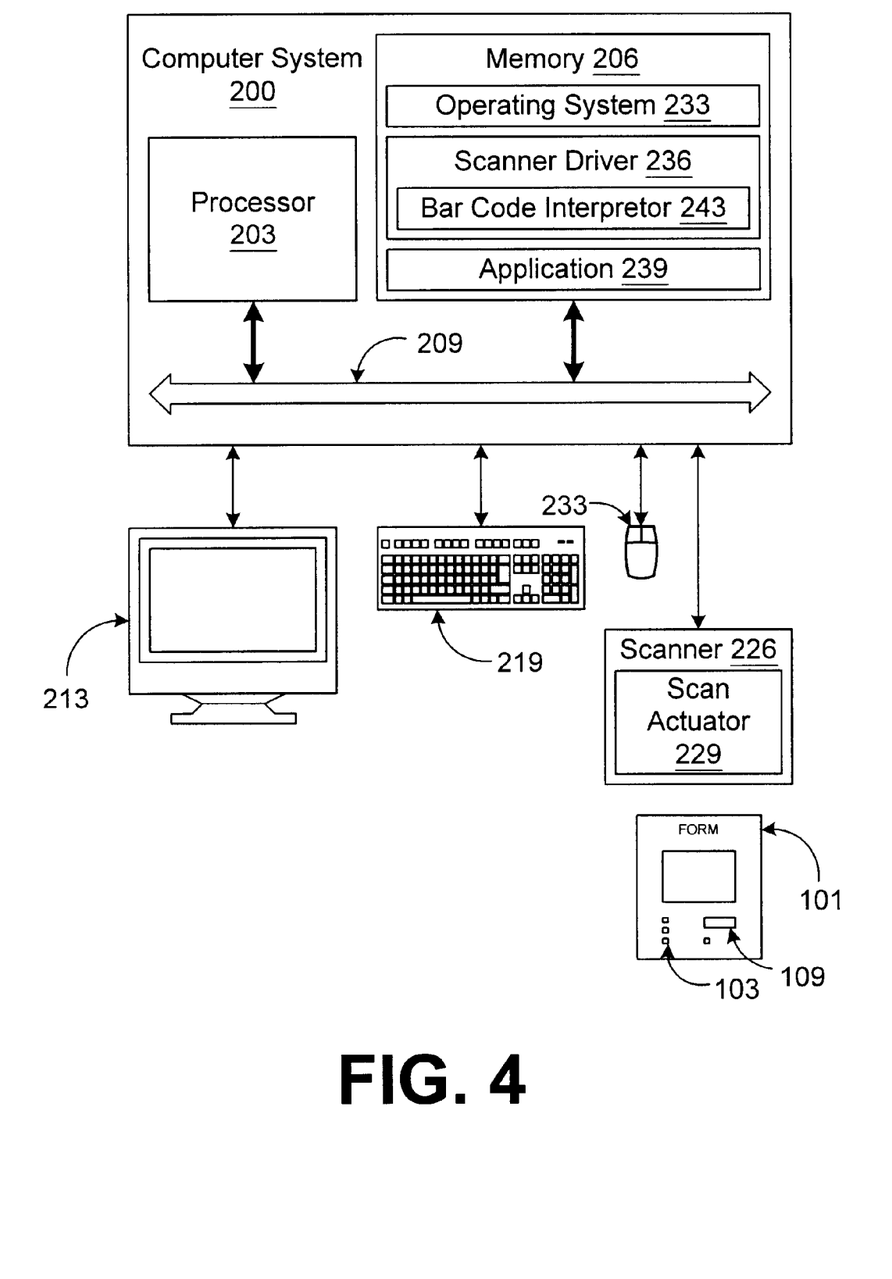
FIG. 4 is a drawing of a document scanning system that is employed to scan the document of FIG. 1 and execute one or more applications with the data embodied in the two dimensional bar code.

Turning then to FIG. 4, shown is a computer system 200 according to an embodiment of the present invention. The computer system 200 is employed to scan in the document 100 and to interpret the bar code 109 included thereon as will be described.

The computer system 200 includes a processor circuit having a processor 203 and a memory 206, both of which are coupled to a local interface 209. The local interface 209 may be, for example, a data bus with an accompanying control/address bus as is generally known by those with ordinary skill in the art. The computer system 200 may also include a display device 213, a keyboard 219, a mouse 223, and a scanner 226. Other peripheral devices that may be employed with the computer system 200 include, for example, a keypad, touch pad, touch screen, microphone, joystick, or one or more push buttons, etc. The peripheral devices may also include indicator lights, speakers, printers, etc. The display device 213 may be, for example, a cathode ray tube (CRT), a liquid crystal display screen, a gas plasma-based flat panel display, or other type of display device, etc. Other peripheral devices may also be used with the computer system 200 as can be appreciated by those with ordinary skill in the art.

The computer system 200 also includes a number of software components such as an operating system 233, a scanner driver 236, and an application 239. The scanner driver 236 includes a bar code interpreter 243, the operation of which will be discussed. The scanner 226 includes a scan actuator 229 that may be, for example, a push button or other device that may cause the scanner 226 to implement a scan operation. The various software components of the present invention may be created using one of a number of programming languages including, for example, C, C++, Java, and other languages that are known by those with ordinary skill in the art.

The memory 206 is defined herein as both volatile and nonvolatile memory and data storage components. Volatile components are those that do not retain data values upon loss of power. Nonvolatile components are those that retain data upon a loss of power. Thus, the memory 206 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 203 may represent multiple processors and the memory 206 may represent multiple memories that operate in parallel. In such a case, the local interface 209 may be an appropriate network that facilitates communication between any two of the multiple processors, between any processor and any one of the memories, or between any two of the memories etc. The processor 203 may be electrical or optical in nature.

Next the operation of the computer system 200 is described. To begin, assume that a user wishes to access the information detailed in the document 100 in an electronic format that is compatible with the application 239 in the computer system 200. First, the user marks the selectors 103 as appropriate indicating the application to be used or indicating that some other function be performed. Then, the user places the document 100 into the scanner 226 and actuates the scan actuator 229.

The scanner 229 then proceeds to scan the document 100, thereby creating a digital document therefrom that is stored in the memory 206. In this respect, the digital document includes the selectors 103, the bar code 109 and all other aspects of the document 100 as can be appreciated by those with ordinary skill in the art. The specific functionality of the scanner 226 is generally known by those with ordinary skill in the art and, consequently, it is not discussed herein in detail. The digital document representation of the document 100 may be in any appropriate format such as a bitmap or other appropriate format as can be appreciated by those with ordinary skill in the art.

The scanner driver 236 communicates with the scanner 226 in performing the scan operation. Upon scanning in the document 100, the bar code interpreter 243 examines the digital document to identify whether a bar code 109 is located thereon. If such is the case, then the bar code interpreter 243 is executed. Based upon the selectors 103 that have been marked, the bar code interpreter 243 proceeds to access the appropriate data files 119 (FIG. 2) within the data that is embodied into the bar code 109. The bar code interpreter 243 then executes the application 239 identified in the bar code as associated with the respective data files 119. Ultimately, the data included in the data files 119 is accessed and manipulated by the application 239 as is appropriate, thereby eliminating the necessity of having to enter any information displayed on the document 100 manually.

Figure 5:
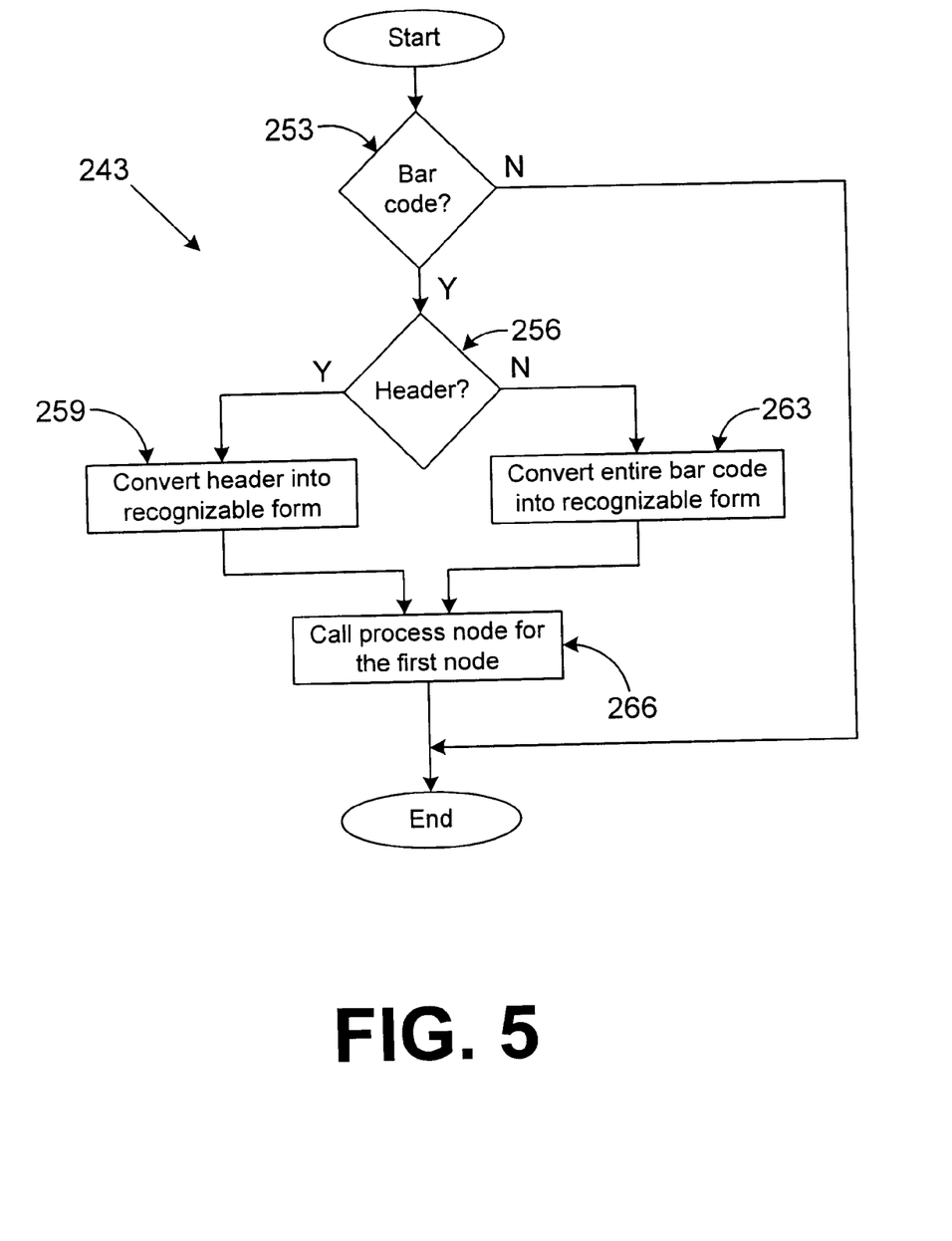
FIG. 5 is a flow chart of a first portion of a bar code interpreter implemented in the document scanning system of FIG. 4.

Turning then to FIG. 5, shown is a flow chart of a first portion of the bar code interpreter 243 according to an aspect of the present invention. Alternatively, the flow chart of FIG. 5 may be viewed as depicting steps of a method implemented in the computer system 200. The bar code interpreter 243 is implemented in the computer system 200 to obtain a data file 119 (FIG. 2) from the data 113 (FIG. 2) that includes the header 116 (FIG. 2). Also, the bar code interpreter 243 launches the application 239 (FIG. 4) with the data file 119.

Beginning with block 253, the bar code interpreter 243 determines whether a bar code 109 (FIG. 1) has been scanned as a portion of a document 100 (FIG. 1) that should be parsed to convert respective data files 119 contained therein for access by an application 239 (FIG. 4). If so, then the bar code interpreter 243 proceeds to box 256 it is determined whether a header 116 exists in the bar code 109, otherwise the bar code interpreter 243 ends as shown. This may be done, for example, by converting the first few characters embodied in the bar code 109 to identify "header" tags or their equivalent that signify the existence of a header.

Assuming that a header is discovered, the bar code interpreter 243 moves to box 259 in which the header 116 is identified in the bar code and converted into a form that is recognizable by the computer system 200. The header 116 is located in a known position in the bar code 109. This position may be, for example, at the beginning of the bar code 109. As such, only the portion of the bar code 109 containing the header 116 need be converted into a recognizable file to provide an ability of the bar code interpreter 243 parse or otherwise process the header 116 itself.

On the other hand, assuming that no header 116 is discovered in box 256, then the bar code interpreter 143 proceeds to box 263 in which the entire bar code is converted to a recognizable form.

From box 259 or box 263, the bar code interpreter 143 proceeds to box 266 in which a process is called to process the first node in either the header 116 (FIG. 2) or the data 113a (FIG. 3). Thereafter, the first portion of the bar code interpreter 143 ends as shown.

Figure 6:
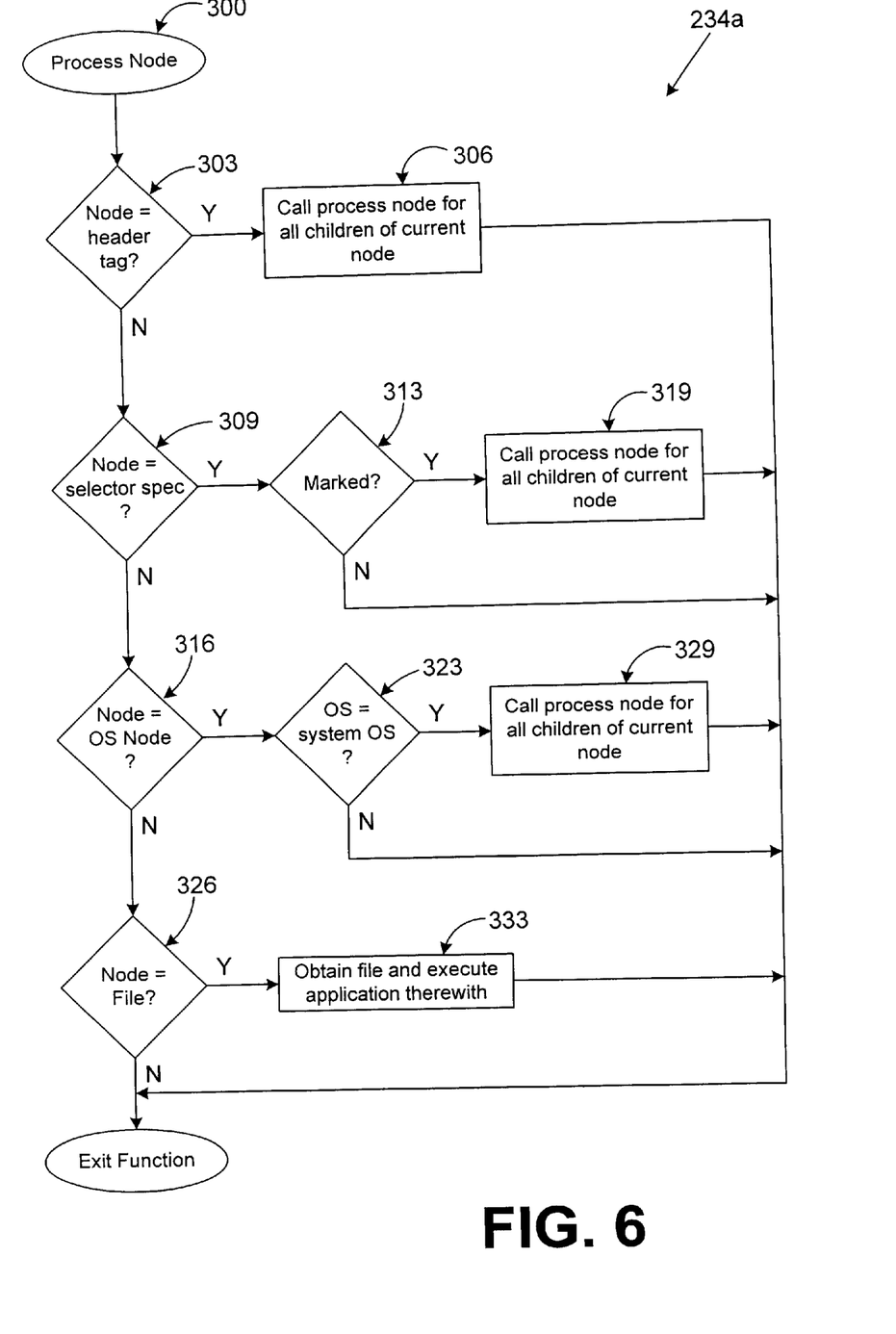
FIG. 6 is a flow chart of a second portion of the bar code interpreter implemented in the document scanning system of FIG. 4.

Referring to FIG. 6, shown is a flow chart of a second portion of the bar code interpreter 243 that comprises a recursive routine 243a according to an aspect of the present invention. Alternatively, the flow chart of FIG. 5 may be viewed as depicting steps of a method implemented in the computer system 200. The recursive routine 243a is called to process the various nodes in the data 113 (FIG. 2) or 113a (FIG. 3). It is understood that a non-recursive program may be employed in the place of the recursive routine 243a.

The recursive routine 243a includes a process node 300 that identifies the beginning of the recursive routine. Beginning at the process node 300, the recursive routine 243a proceeds to box 303 in which it is determined whether the current node of the header 116 (FIG. 2) or data 113a (FIG. 3) is a header tag. If such is the case, then the recursive routine 243a moves to box 306 in which the process node 300 is called for all of the children of the current node. Otherwise, the recursive routine 243a proceeds to box 309. After the process node is called for the children of the current node in box 306, the recursive routine 243a ends accordingly.

In box 309, the recursive routine 243a determines whether the current node is a selector specification 123 (FIGS. 2 and 3). If so, then the recursive routine 243a proceeds to box 313. Otherwise, the bar code interpreter progresses to box 316. In box 313, the recursive routine 243a determines whether the selector 103 (FIG. 1) that is specified in the selector specification 313 has been marked by an individual. This may be determined by examining the selector 103 for a mark given that the selector location and size is noted in the selector specification 313. If the associated selector 103 is not marked in box 313, then the recursive routine 243a ends.

If the associated selector 103 is marked in some manner, then in box 319 the recursive routine 243a moves to box 319 in which the process node 300 is called for all of the children of the current node. Thereafter, the recursive routine 243a ends.

In some circumstances, the selectors 103 may not be employed with respect to the data 113. In particular, the bar code interpreter 243 may employ the mime types 132 that are associated with the respective data files 119 to determine the specific application 239 that is to be executed to access a respective data file 119. In such case, blocks 309, 313, and 319 may be eliminated and selector references 126 may be eliminated from the selector specifications 123.

In box 316, the recursive routine 243a determines whether the current node is an operating system tag 127. If so, then the recursive routine 243a moves to box 323. Otherwise, the recursive routine 316 proceeds to box 326. In box 323, the recursive routine 243a determines whether the operating system 233 (FIG. 4) in the computer system 200 is the same as the operating system 136 identified in the current node. If so, then the recursive routine proceeds to box 329 in which the process node 300 is called for all of the children of the current node. Otherwise, the recursive routine 243a ends. After the process node 300 is called in box 329, the recursive routine 243a also ends as shown.

In box 326, if the current node is a file specification 128 (FIGS. 2 and 3) that indicates a file for processing, then the recursive routine 243a proceeds to box 333. Otherwise, the recursive routine 243a ends. In box 333, the file 119 (FIGS. 2 and 3) associated with the file specification 128 is accessed and the associated application 239 (FIG. 4) is implemented therewith. In the case of the data 113 (FIG. 2), the file 119 is accessed by indexing through the bar code 109 based on the data file pointer 129 and converting the portion of the bar code 109 that contains the file 119 into a form recognized by the computer system 200. This is advantageous in that the entire bar code 109 need not be converted, thereby reducing the processing time.

Thereafter, the appropriate application 239 is executed to access the data in the data file 119. In determining the appropriate application 239 to be executed, the file extension of the filename 131 may be employed or the mime type 132 (FIG. 2 or 3) associated with the respective data file 119 may be accessed. Also, in executing the appropriate application 239, the command line parameter 139 may be applied thereto to implement the respective function in the application 239.

In the case of the data 113a (FIG. 3), the file 119 is associated with the file specification 128 due to its location in the data 113a relative to the file specification 128 and is accessed accordingly. The proper application 239 is then executed in the same manner as was described above with any listed command line parameter 139 as is appropriate. There need be no conversion of the file 119 from the bar code 109 as this was done in box 263 (FIG. 5). From box 333, the recursive routine 243a ends as shown.

The use of the recursive routine 243a provides an advantage in terms of speed of operation in light of the use of the structure of the data 113/113a. Specifically, the "tree" organization of the data 113/113a provides the nodes and children that may be processed by the recursive routine 243a. The recursive routine 243a thus parses the data 113/113a to find the various components therein and acts accordingly.

Although the bar code interpreter 243/243a of the present invention is embodied in software or code executed by general purpose hardware as discussed above, as an alternative the bar code interpreter 243/243a may also be embodied in dedicated hardware or a combination of software/ general purpose hardware and dedicated hardware. If embodied in dedicated hardware, the bar code interpreter 243/243a can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 5 and 6 show the architecture, functionality, and operation of implementations of the bar code interpreter 243/243a. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the flow charts of FIGS. 5 and 6 are relatively self-explanatory and are understood by those with ordinary skill in the art to the extent that software and/or hardware can be created by one with ordinary skill in the art to carry out the various logical functions as described herein.

Also, where the bar code interpreter 243/243a comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the bar code interpreter 243/243a for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

We claim:

1. A document, comprising:
an amount of data embodied in a bar code located on the document;
a number of data files included in the data;
a selector located on the document, the selector being positioned relative to a predefined point on the document;
a selector specification included in the data, the selector specification referencing the position of the selector relative to the predefined point on the document; and
an association in the data drawn between the selector specification and at least one of the data files.

2. The document of claim 1, wherein the data includes a header, the selector specification being located in the header.

3. The document of claim 2, wherein the selector specification further comprises at least one pointer that indicates a position of the at least one the data files in the bar code.

4. The document of claim 2, wherein:
the header is arranged in an associative data structure; and
the association in the data drawn between the selector specification and the at least one of the data files further comprises a listing of a file specification associated with the at least one of the data files as subordinate to the selector specification.

5. The document of claim 1, wherein the at least one of the data files is located in a predefined position relative to the selector specification, theereby drawing the association in the data between the selector specification and the at least one of the data files.

6. The document of claim 1, wherein the selector specification further comprises a set of coordinates that identifies the position of the selector relative to the predefined point on the document.

7. The document of claim 1, wherein the selector specification further comprises an application identifier associated with at least one of the data files that identifies an application that is to be executed to access the at least one of the data files.

8. The document of claim 7, wherein the selector specification further comprises at least one command line parameter associated with the application that is implemented upon executing the application.

9. A data access method, comprising:
scanning a document to create a digital document therefrom, the digital document having a bar code and at least one selector located thereon, wherein an amount of data is embodied in the bar code that includes a number of data files;
identifying a selector specification embodied in the data, the selector specification being associated with the at least one selector;
determining whether the at least one selector has been marked; and
executing an application with at least one of the data files that is associated with the at least one selector specification when the at least one selector associated therewith is marked.

10. The data access method of claim 9, wherein the step of identifying the selector specification embodied in the data further comprises:
converting a header included in the data from the bar code into a recognizable data format; and
parsing the header to find the selector specification.

11. The data access method of claim 9, wherein the step of identifying the selector specification embodied in the data further comprises:
converting the data embodied in the bar code into a recognizable data format; and
parsing the data to find the selector specification.

12. The data access method of claim 11, further comprising drawing an associated between the selector specification and at least one of the data files based upon a relative placement of the at least one of the data files and the selector specification within the data.

13. The data access method of claim 10, further comprising locating at least one of the data files in the bar code based upon a pointer associated with the selector specification that indicates a position of the at least one of the data files in the bar code.

14. The data access method of claim 9, wherein the step of determining whether the at least one selector has been marked further comprises obtaining a set of coordinates that identifies the position of the selector relative to the predefined point on the document from the selector specification.

15. The data access method of claim 9, wherein the step of executing the application with the at least one of the data files further comprises applying at least one command line parameter obtained from the data to the application when accessing one of the data files therewith.

16. A program embodied in a computer readable medium, comprising:

code that identifies a selector specification in an amount of data that is embodied in a bar code included in a digital document, the data including a number of data files, the digital document including a selector that is associated with the selector specification;

code that determines whether the selector has been marked; and code that executes an application with at least one of the data files that is associated with the selector specification when the selector associated therewith is marked.

17. The program embodied in the computer readable medium of claim 16, wherein code that identifies the selector specification in the amount of data further comprises:

code that converts a header included in the data from the bar code into a recognizable data format; and code that parses the header to find the selector specification.

18. The program embodied in the computer readable medium of claim 16, further comprising:

code that converts a header included in the data from the bar code into a recognizable data format; and code that parses the header to find an operating system tag, wherein at least one of the data files is associated with the operating system tag.

19. The program embodied in the computer readable medium of claim 17, further comprising code that locates at least one of the data files in the bar code based upon a pointer associated with the selector specification that indicates a position of the at least one of the data files in the bar code.

20. The program embodied in the computer readable medium of claim 16, wherein the code that identifies the selector specification embodied in the data further comprises:

code that converts the data embodied in the bar code into a recognizable data format; and code that parses the data to find the selector specification.

21. The program embodied in the computer readable medium of claim 16, further comprising:

code that converts the data embodied in the bar code into a recognizable data format; and code that parses the data to find an operating system tag, wherein at least one of the data files is associated with the operating system tag.

22. The program embodied in the computer readable medium of claim 20, further comprising code that draws an associated between the selector specification and at least one of the data files based upon a placement of the selector specification in a predefined position relative to the at least one of the data files within the data.

23. The program embodied in the computer readable medium of claim 9, wherein the code that determines whether the at least one selector has been marked further comprises code that obtains a set of coordinates that identifies the position of the selector relative to the predefined point on the document from the selector specification.

24. The program embodied in the computer readable medium of claim 9, wherein the code that executes the application with the at least one of the data files further comprises code that applies at least one command line parameter obtained from the data to the application when accessing one of the data files therewith.

25. A system for data access, comprising:

means for identifying a selector specification in an amount of data that is embodied in a bar code included in a digital document, the data including a number of data files, the digital document including a selector that is associated with the selector specification;

means for determining whether the selector has been marked; and means for executing an application with at least one of the data files that is associated with the selector specification when the selector associated therewith is marked.

26. The system of claim 25, wherein the means for identifies a selector specification embodied in the data further comprises:

means for converting a header included in the data from the bar code into a recognizable data format; and means for parsing the header to find the selector specification.

27. The system of claim 26, further comprising means for locating at least one of the data files in the bar code based upon a pointer associated with the selector specification that indicates a position of the at least one of the data files in the bar code.

28. The system of claim 25, wherein the means for identifying the selector specification embodied in the data further comprises:

means for converting the data embodied in the bar code into a recognizable data format; and means for parsing the data to find the selector specification.

29. The system of claim 28, further comprising means for drawing an associated between the selector specification and at least one of the data files based upon a placement of the selector specification in a predefined position relative to the at least one of the data files within the data.

30. The system of claim 25, wherein the means for determining whether the at least one selector has been marked further comprises means for obtaining a set of coordinates that identifies the position of the selector relative to the predefined point on the document from the selector specification.

31. The system of claim 25, wherein the means for executing the application with the at least one of the data files further comprises means for applying at least one command line parameter obtained from the data to the application when accessing one of the data files therewith.

* * * * *